United States Patent
Nakata et al.

(10) Patent No.: US 8,548,641 B2
(45) Date of Patent: Oct. 1, 2013

(54) LOAD DRIVE CIRCUIT

(75) Inventors: Hisayoshi Nakata, Hitachinaka (JP);
Masahiro Sasaki, Hitachinaka (JP);
Takuya Mayuzumi, Hitachinaka (JP);
Mitsuhiko Watanabe, Odawara (JP);
Ryoichi Oura, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 816 days.

(21) Appl. No.: 12/191,618

(22) Filed: Aug. 14, 2008

(65) Prior Publication Data

US 2009/0079435 A1   Mar. 26, 2009

(30) Foreign Application Priority Data

Sep. 20, 2007  (JP) ................................. 2007-244358

(51) Int. Cl.
*G05D 1/00* (2006.01)

(52) U.S. Cl.
USPC ............................................ 701/1; 701/29.1

(58) Field of Classification Search
USPC ............. 701/1, 29, 30, 31, 36, 34, 29.1–34.4, 701/29.7, 29.8, 29.9, 30.1, 30.3, 30.4, 31.8, 701/32.8, 33.6, 33.7, 33.8, 33.9; 324/500
See application file for complete search history.

(56) References Cited

U.S. PATENT DOCUMENTS

| | | | | |
|---|---|---|---|---|
| 4,275,342 A * | 6/1981 | Kawada et al. | ............... | 318/490 |
| 5,345,532 A * | 9/1994 | Fukushima | .................... | 388/813 |
| 5,659,208 A | 8/1997 | Kimble | | |
| 6,153,993 A * | 11/2000 | Oomura et al. | ............... | 318/434 |
| 6,477,453 B2 * | 11/2002 | Oi et al. | ........................... | 701/31 |
| 6,625,522 B2 * | 9/2003 | Sakurai et al. | ..................... | 701/1 |
| 6,831,433 B2 * | 12/2004 | Furui | ............................ | 318/432 |
| 6,906,492 B2 * | 6/2005 | Matsushita | .................... | 318/727 |
| 7,102,306 B2 * | 9/2006 | Hamaoka et al. | ........ | 318/400.01 |
| 7,457,089 B2 * | 11/2008 | Ohshima | ......................... | 361/86 |
| 2001/0053952 A1 * | 12/2001 | Kodaka et al. | ................... | 701/43 |
| 2004/0004483 A1 * | 1/2004 | Hazelton | ....................... | 324/522 |

(Continued)

FOREIGN PATENT DOCUMENTS

| | | |
|---|---|---|
| EP | 1 783 886 A2 | 5/2007 |
| JP | 11-013519 A | 1/1999 |

(Continued)

OTHER PUBLICATIONS

Japanese Office Action dated Sep. 8, 2009 (Two (2) pages).
EP Office Action dated Jul. 11, 2012, Three (3) pages.

*Primary Examiner* — Darnell Jayne
*Assistant Examiner* — Patrick Hawn
(74) *Attorney, Agent, or Firm* — Crowell & Moring LLP

(57) ABSTRACT

According to the present invention, the operation of a diagnostic circuit within a load drive circuit, which has been built into an electronic control device, is checked without modifying the electronic control device or the like. The load drive circuit, which drives a load such as a solenoid using a DC power supply as a power supply, includes a drive circuit and a diagnostic circuit which is independently provided within the drive circuit. Upon input of a drive-stop signal from a control circuit that controls the drive circuit, the operation of at least the drive circuit stops, so that whether the diagnostic circuit, which diagnoses the condition of the load, is normally operating or not is checked in a condition in which the load drive circuit has been built into the electronic control device.

24 Claims, 5 Drawing Sheets

(56) References Cited

U.S. PATENT DOCUMENTS

| | | | |
|---|---|---|---|
| 2004/0230347 A1* | 11/2004 | Sakurai et al. | 701/1 |
| 2005/0194998 A1 | 9/2005 | Watanabe | |
| 2006/0018636 A1 | 1/2006 | Watanabe et al. | |
| 2006/0220607 A1* | 10/2006 | Imagawa et al. | 318/638 |
| 2007/0208475 A1* | 9/2007 | Shimizu | 701/45 |
| 2007/0227506 A1* | 10/2007 | Perryman et al. | 123/479 |
| 2008/0086250 A1* | 4/2008 | Kuivenhoven | 701/45 |

FOREIGN PATENT DOCUMENTS

| | | | |
|---|---|---|---|
| JP | 11013519 A * | 1/1999 | |
| JP | 2001-304025 A | 10/2001 | |
| JP | 2002-257668 A | 9/2002 | |
| JP | 2005-287284 A | 10/2005 | |
| JP | 2006-42446 A | 2/2006 | |

\* cited by examiner

LOAD DRIVE CIRCUIT

BACKGROUND OF THE INVENTION

1. Field of the Invention

The present invention relates to a load drive circuit such as a low-side driver, high-side driver, or motor driver, which is constructed from a typical electric/electronic circuit and is built into an electronic control device and which has a function of checking the operation of a diagnostic circuit for diagnosing the condition of a load.

2. Background Art

Some conventional load drive circuits such as a low-side driver, high-side driver, or motor driver that are constructed from typical electric/electronic circuits have circuits that diagnose the condition of a load being driven. Such a diagnostic circuit judges the condition of the load by monitoring the output voltage of the load, the current flowing through the load, or the like while the load is being driven or not driven. The operation of such load drive circuit with a diagnostic function is checked by executing the diagnostic function while the load is being driven or not driven. However, in order to check the diagnostic circuit, it is necessary to operate the drive circuit by putting it in a disable state, which is different from a normal mode, and by checking whether or not the diagnostic circuit can diagnose the condition of the load.

However, once a load drive circuit has been built into an electronic control device including a load, it is impossible for a diagnostic circuit of the load drive circuit to detect an abnormality of the load within the control device unless the load actually has an abnormality. Therefore, establishing a method for checking the operation of the diagnostic circuit after it has been built into the control device is an object to be achieved.

Reference 1 (JP Published Patent Application No. 11-13519 A (1999)) discloses a method of creating an abnormal state by actually turning off only a power supply of a load within an electronic control device, in order to check the operation of a diagnostic circuit. Reference 2 (JP Published Patent Application No. 2002-257668 A) discloses a method of running a control device on a simulator and creating an abnormal state on the simulator. However, since these methods create abnormal states in an artificial manner, there is a problem in that the operation of the diagnostic circuit cannot be checked after it has been built into the control device and is actually used.

SUMMARY OF THE INVENTION

It is an object of the present invention to conduct a quasi-check of the operation of a diagnostic circuit within a load drive circuit after the diagnostic circuit has been built into a control device.

In order to solve the aforementioned problems, the present invention provides a load drive circuit that is built into an electronic control device and that drives a load such as a solenoid, relay, switch, heater, or motor using a DC power supply as a power supply, the load drive circuit comprising a drive circuit and a diagnostic circuit that is independently provided within the drive circuit. Upon input of a drive-stop signal from a control circuit that controls the drive circuit, the operation of at least the drive circuit stops, so that whether the diagnostic circuit, which diagnoses the condition of the load, is normally operating or not is checked in a condition in which the load drive circuit has been built into the electronic control device.

The load drive circuit according to the present invention has a configuration in which the drive circuit and the diagnostic circuit are independent of each other, and the operation of at least the drive circuit stops in response to a drive-stop signal from the control circuit.

According to one aspect of the load drive circuit of the present invention, a load drive signal is input to the load drive circuit, in which the operation of at least the drive circuit has stopped in response to the drive-stop signal from the control circuit, to detect an abnormality of the load, so that the whether the diagnostic circuit is normally operating or not is checked.

According to one aspect of the load drive circuit of the present invention, whether the diagnostic circuit is normally operating or not is checked during a system initialization process, which is executed after the control circuit, which controls the electronic control device including the load drive circuit, has been switched on.

According to one aspect of the load drive circuit of the present invention, whether the diagnostic circuit is normally operating or not is checked during a system stop process, which is executed during the period from the input of a power-off signal to the electronic control device including the load drive circuit until the power is actually switched off.

According to one aspect of the load drive circuit of the present invention, the drive circuit is a low-side driver; the drive circuit, in response to a drive-stop signal, enters a disable state in which the operation of at least the drive circuit stops; and the drive circuit, in response to an input signal for driving, causes the diagnostic circuit to monitor the voltage at a terminal of the load or the current flowing through the drive circuit, so that the operation of the diagnostic circuit is checked.

According to one aspect of the load drive circuit of the present invention, the drive circuit is a high-side driver; the drive circuit, in response to a drive-stop signal, enters a disable state in which the operation of at least the drive circuit stops; and the drive circuit, in response to an input signal for driving, causes the diagnostic circuit to monitor the voltage at a terminal of the load or the current flowing through the drive circuit, so that the operation of the diagnostic circuit is checked.

According to one aspect of the load drive circuit of the present invention, the drive circuit is a motor drive circuit that drives a motor such as a brushed DC motor, three-phase motor, or stepping motor; the drive circuit, in response to a drive-stop signal, enters a disable state in which the operation of at least the drive circuit stops; and the drive circuit, in response to an input signal for driving, causes the diagnostic circuit to monitor the voltage at a terminal of the load or the current flowing through the drive circuit, so that the operation of the diagnostic circuit is checked.

According to one aspect of the load drive circuit of the present invention, the load drive circuit is built into a vehicle's load drive device, and whether the diagnostic circuit is normally operating or not is checked during the system initialization process, which is executed after an ignition key of a vehicle has been turned to an "on" position.

According to one aspect of the load drive circuit of the present invention, the load drive circuit is built into a vehicle's load drive device, and whether the diagnostic circuit is normally operating or not is checked during the system stop process, which is executed after an ignition key of a vehicle has been turned to be an "off" position.

According to one aspect of the load drive circuit of the present invention, a switching element of the drive circuit is a bipolar transistor.

According to one aspect of the load drive circuit of the present invention, a switching element of the drive circuit is an FET.

According to one aspect of the load drive circuit of the present invention, a switching element of the drive circuit is an IGBT.

According to the present invention, whether the diagnostic circuit in the drive circuit is normally operating or not can be easily checked without detaching the load drive circuit from the electronic control device, deliberately causing the load to have an abnormality, or modifying the electronic control device.

In the vehicle's load drive device, whether the diagnostic circuit is normally operating or not can be easily checked during the system initialization process or system stop process, which is executed every time an ignition key is turned to an "on" or "off" position.

BRIEF DESCRIPTION OF THE DRAWINGS

In the accompanying drawings:

FIG. 2 illustrates an operation check sequence of a diagnostic circuit when power is switched on;

DETAILED DESCRIPTION OF THE PREFERRED EMBODIMENTS

Preferred embodiments of the present invention will be described hereinafter with reference to the accompanying drawings.

Embodiment 1

Figure 1:
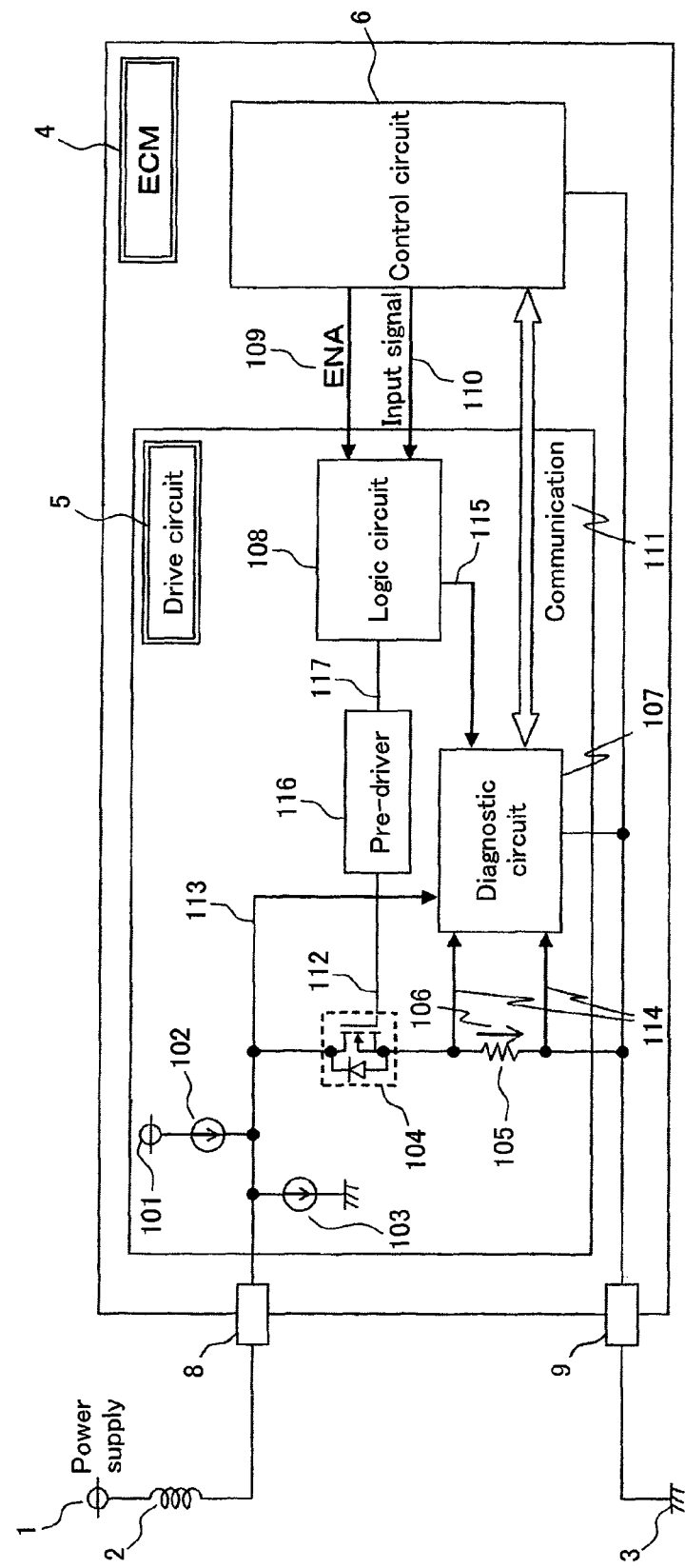
FIG. 1 illustrates Embodiment 1 in which the present invention is applied to a low-side driver circuit.

FIG. 1, which relates to Embodiment 1, is a block diagram illustrating the configuration of a low-side driver circuit, which is one of the drive circuits of a vehicle's engine control module 4 (hereinafter also referred to as an "ECM") mounted in a vehicle.

The low-side driver circuit is a circuit provided downstream of a power supply 1 and a load 2, which is a drive circuit 5 including a diagnostic circuit 107 for monitoring the voltage at a connection terminal of the load and an FET 104, which is a switching element, or for monitoring the current flowing through the load. As illustrated in FIG. 1, the drive circuit 5 further includes a power supply 101, current sources 102 and 103, resistor 105 having a current flow 106 across the input terminals 114 of the diagnostic circuit 107, logic circuit 108 for communication with the control circuit 6, and pre-driver 116. The input to the pre-driver 116 is output 117 of the logic circuit 108, and the output of the pre-driver 116 is input 112 to the FET 104. Inputs to the diagnostic circuit include inputs 113, 114, and 115, as well as communication line 111 between the diagnostic circuit 107 and the control circuit 6. The drive circuit 5 is connected to a control circuit 6, which controls the drive circuit 5. Note that it is also possible to employ, depending on the characteristics of the load to be driven, a structure in which the drive circuit is protected with the use of a clamping Zener diode, a free wheel diode, or the like. Examples of loads include solenoids, relays, switches, and heaters. In the example illustrated in FIG. 1, a solenoid is used. In addition, examples of input signals for driving the load include signals of frequency, PWN, voltage, and current.

The diagnostic circuit in the drive circuit illustrated in FIG. 1 determines that the circuit is shorted to GND 3 via drive terminal 9 if the voltage of a drive terminal 8 when the drive circuit is off (that is, when the FET 104 is off) is less than or equal to a predetermined voltage; that the circuit is shorted to the power supply if the voltage of the drive terminal 8 when the drive circuit is on (that is, when the FET 104 is on) is greater than or equal to a predetermined voltage; and that the load is broken when the voltage of the drive terminal 8 when the drive circuit is on (that is, when the FET 104 is on) is an intermediate potential (and diagnosis may further be conducted by monitoring a current).

Generally, once an engine control module has been mounted in a vehicle, it is impossible to cause a load to have an abnormality; therefore, the operation of a diagnostic circuit cannot be checked. However, the present invention makes it possible to check the operation of the diagnostic circuit after the engine control module has been mounted in a vehicle. The operation principle is described hereinafter.

A stop signal (ENA signal) 109 is transmitted from the control circuit to a drive-stop terminal (ENA terminal), which is added as a function to the drive circuit. Accordingly, after that, the pre-driver 116 will not be turned on in response to the application of an input signal 110 for driving. Thus, the FET 104, which is a switching element, remains off. Here, the diagnostic circuit 107 diagnoses the load in accordance with the input signal for driving. Generally, the FET 104, which is a switching element, is turned on in response to the input signal 110 for driving, whereby the voltage level of the drive terminal 8 becomes low. However, since the function of the drive circuit stops at such point, the voltage of the drive terminal 8 is unchanged at a high level. (It is also possible to monitor a current to check if there is no current flow.) In the above manner, the diagnostic circuit detects an abnormality of the load.

Next, an operation check sequence for checking the operation of such diagnostic circuit when power is switched on and off is described.

Figure 2:
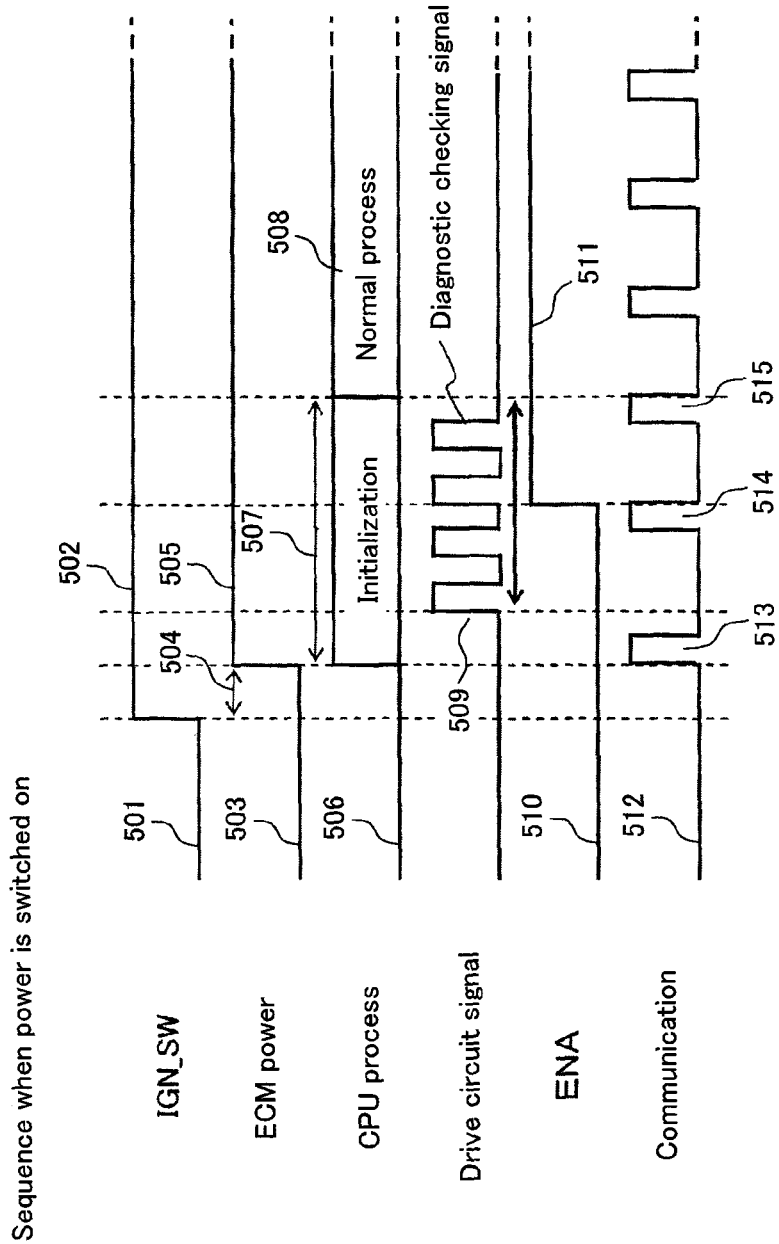

FIG. 2 illustrates the operation check sequence of the diagnostic circuit when power is switched on. Once an ignition switch IGN_SW is turned from an "off" position 501 to an "on" position 502, ECM power is supplied and a CPU starts initialization. As shown in FIG. 2, ECM power transitions from low level 503 to high level 505 when ECM power is turned on. The time between the ignition switch IGN_SW going high and the ECM power going on is represented by period 504. Before initialization of the CPU process, which occurs during period 507, the off state of the CPU process is represented by low level 506. The normal process 508 of the CPU occurs after the initialization. Then, a signal for diagnostic checking is requested via communication and a diagnostic checking signal 509 is input. With this signal, diagnosis in an inactive (disable) state is conducted first. Here, the diagnostic circuit judges the presence or absence of an abnormality, and then, it conducts diagnosis in an active (enable) state. As shown in FIG. 2, the ENA signal 109 changes from low level 510 ("off") to high level 511 ("on") during transmission of the diagnostic checking signal 509. These diagnosis results are transmitted to the control circuit 6 via the communication line 111, so that initialization is terminated and the CPU enters the normal operation mode. The communication signals are illustrated in FIG. 2 as pulses 513, 514, and 515, while a low signal level 512 is maintained between transmitted signals. Through the operation sequence described above, the operation of the diagnostic circuit when power is switched on is checked.

Figure 3:
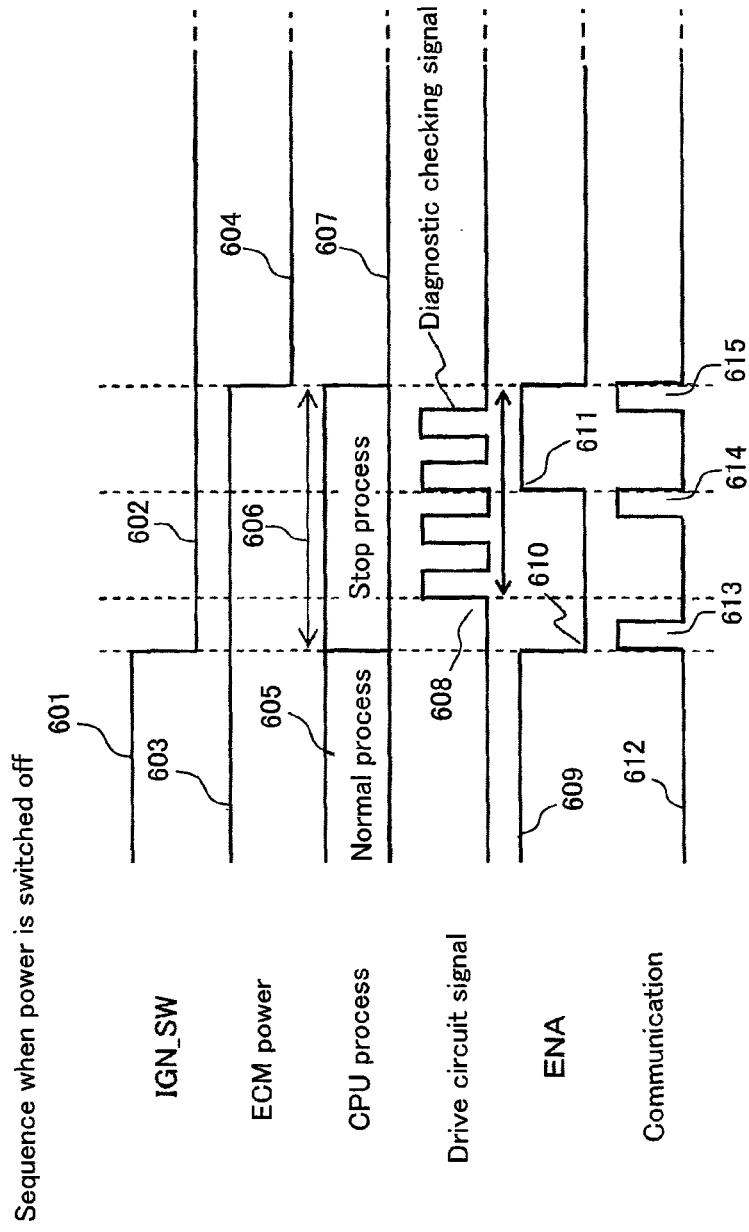
FIG. 3 illustrates an operation check sequence of the diagnostic circuit when power is switched off.

FIG. 3 illustrates the operation check sequence of the diagnostic circuit when power is switched off. Once IGN_SW is turned from an "on" position 601 to an "off" position 602, the CPU switches from a normal process 605 to a stop process that occurs during period 606 and then to an off state 607. Then, a signal for diagnostic checking is requested via communication signals 613, 614, and 615 and a diagnostic checking signal 608 is input. With this signal, diagnosis in a disable state 610 is conducted, after the ENA signal changes from a high level 609, to judge the presence or absence of an abnormality, and then, diagnosis in an enable state 611 is conducted. Then, these diagnosis results are transmitted to the control circuit, so that the stop process of the CPU is terminated and the supply of the ECM power is shut off, i.e., switched from "on" level 603 to "off" level 604. After the communication signals 613, 614, and 615, the communication signal level returns to the low level 612. Through the operation sequence described above, the operation of the diagnostic circuit when power is switched off is checked.

The two sequences described above are basically performed every time IGN_SW is turned to an "on" or "off" position. However, depending on circumstances, the sequence can be performed only when IGN_SW is turned to either an "on" or "off" position. In addition, although diagnosis is also conducted in the enable state in the above sequences, the load is actually driven in this case. Therefore, a diagnostic circuit that has no influence on the operation of the load should be used. Otherwise, the operation of the diagnostic circuit should be checked only in the disable state. Alternatively, if the operation of the load in the normal operation stops for a longer time than the time required for diagnosis, diagnosis similar to the aforementioned can be conducted.

Embodiment 2

Figure 4:
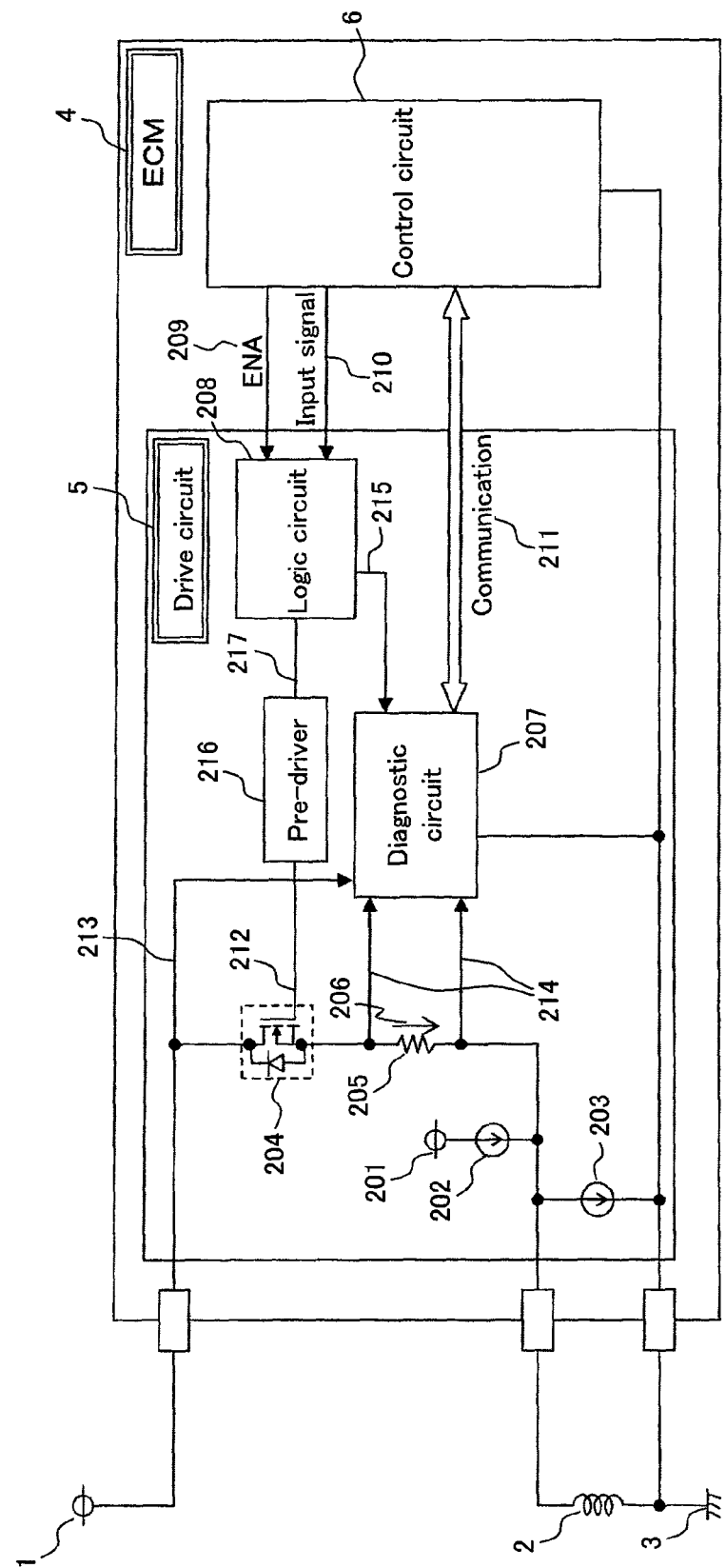
FIG. 4 illustrates Embodiment 2 in which the present invention is applied to a high-side driver circuit.

FIG. 4, which relates to Embodiment 2, is a block diagram illustrating the configuration of a high-side driver circuit, which is one of the drive circuits of an ECM mounted in a vehicle.

The high-side driver circuit is a circuit provided immediately downstream of a power supply 1 and upstream of a load 2, which is a drive circuit 5 including a power supply 201, current sources 202 and 203, a resistor 205 through which is current flow 206 across a diagnostic circuit 207 for monitoring the voltage at a connection terminal of the load and an FET 204, which is a switching element, or for monitoring the current flowing through the load. The drive circuit 5, which further includes a pre-driver 216 and logic circuit 208, is connected to a control circuit 6, which controls the drive circuit 5. The pre-driver 216 has an input 217 from the logic circuit 208 and an output 212 to the FET 204. Inputs to the diagnostic circuit include inputs 213, 214, and 215, as well as communication line 211 between the diagnostic circuit 207 and the control circuit 6. Note that it is also possible to employ, depending on the characteristics of the load to be driven, a structure in which the drive circuit is protected with the use of a clamping Zener diode, a free wheel diode, or the like. Examples of loads include solenoids, relays, and heaters. In the example illustrated in FIG. 4, a solenoid is used.

The diagnostic circuit in the drive circuit illustrated in FIG. 4 determines that the circuit is shorted to GND if the voltage of a drive terminal when the drive circuit is ON (that is, when the FET 204 is on) is less than or equal to a predetermined voltage; that the circuit is shorted to the power supply if the voltage of the drive terminal when the drive circuit is off (that is, when the FET 204 is off) is greater than or equal to a predetermined voltage; and that the load is broken when the voltage of the drive terminal when the drive circuit is on (that is, when the FET 204 is on) is an intermediate potential (and diagnosis may further be conducted by monitoring a current).

The operation principle of the diagnostic circuit according to the present embodiment is described hereinafter.

An ENA signal 209, which is a stop signal, is transmitted from the control circuit 6 to a drive-stop terminal (ENA terminal) added to the drive circuit 5. Accordingly, after that, the pre-driver 216 will not output a signal that turns on the FET 204, which is a switching element, in response to the application of an input signal 210, because the function of the drive circuit 5 has been stopped. Thus, the load 2 remains off. Here, the diagnostic circuit diagnoses the load in response to the input signal 210. Generally, the FET 204, which is a switching element, is turned on in response to an input signal, whereby the voltage level of a drive terminal becomes high. However, since the switching element is not turned on here, the voltage of the drive terminal is unchanged at a low level. Accordingly, the diagnostic circuit detects an abnormality of the load.

Hereinafter, the operation of the diagnostic circuit can be checked in a similar way to that described in Embodiment 1, based on the operation check sequence for checking the operation of the diagnostic circuit when power is switched on and off.

Embodiment 3

Figure 5:
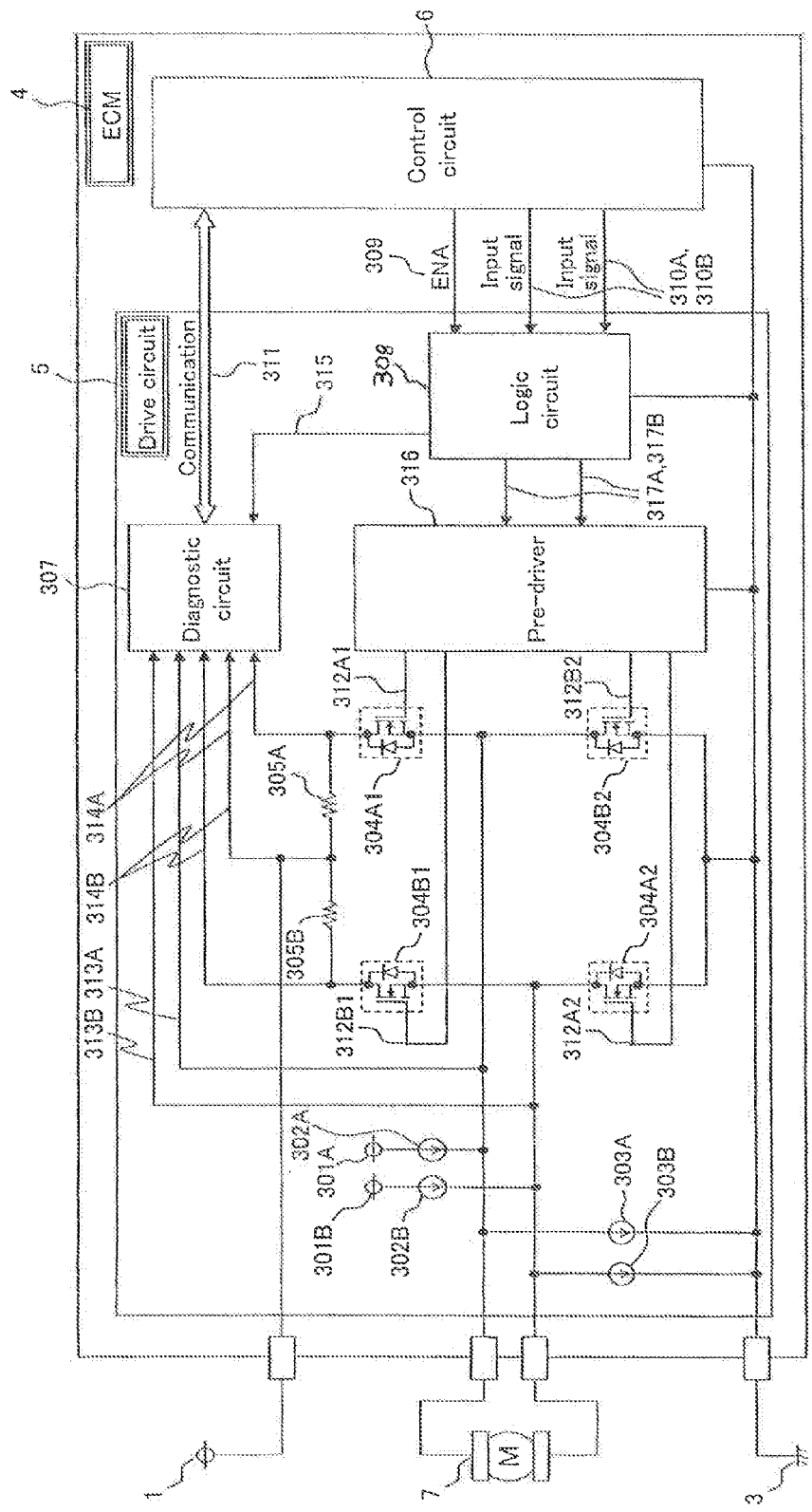
FIG. 5 illustrates Embodiment 3 in which the present invention is applied to an H-bridge driver circuit which drives a brushed DC motor.

FIG. 5, which relates to Embodiment 3, is a block diagram illustrating the configuration of an H-bridge driver circuit for driving a brushed DC motor, which is one of the drive circuits of an ECM mounted in a vehicle.

The H-bridge driver circuit includes a power supply 1, a motor 7 (hereinafter also referred to as a load 7), a drive circuit 5 including FETs 304A1, 304A2, 304B1, and 304B2 having gates 312A1, 312A2, 312B1, and 312B2, respectively, which are switching elements provided upstream and downstream of the motor, on the H bridge, and a diagnostic circuit 307, which monitors the voltage of a terminal of the drive circuit or the current flowing through the load. The drive circuit 5 includes power supplies 301A and 301B and current sources 302A, 302B, 303A, and 303B. The diagnostic circuit 307 has inputs 313A, 313B, 314A, 314B, and 315, as well as communication line 311 between the diagnostic circuit 307 and the control circuit 6. Resistors 305A and 305B are disposed between inputs 314A and 314B, as shown in FIG. 5. The H-bridge driver circuit, which further includes a pre-driver 316 and logic circuit 308, is connected to a control circuit 6 which controls the H-bridge driver circuit. The logic circuit 308 has inputs 309, 310A and 310B and outputs 317A and 317B. As illustrated in FIG. 5, the diagnostic circuit 307 built into the H-bridge driver circuit monitors the drive current when the switching elements are on and the voltage of the terminal when the switching elements are on/off, and it detects an excess current or low voltage.

First, a stop signal (ENA signal) 309 is transmitted from the control circuit to a drive-stop terminal (ENA terminal), which is added as a function to the drive circuit 5. After that, the switching elements (FET) 304A1, 304A2, 304B1, and 304B2 will not be turned on in response to the application of input signals 310 because the function of the drive circuit has been stopped. Thus, the load 7 remains off. Here, the diagnostic circuit diagnoses the load in response to the input signal.

Generally, the FETs 304A1, 304A2, 304B1, and 304B2, which are switching elements, are turned on in response to input signals, whereby the voltage level of a drive terminal becomes high. However, since the switching elements are not turned on here, the voltage of the drive terminal is kept at an intermediate voltage level due to the voltage source in the drive circuit. Accordingly, the diagnostic circuit can detect an abnormality. The operation of the diagnostic circuit can be checked in a similar way to that described in Embodiment 1, based on the sequence (see FIG. 2) when power is switched on and the sequence (see FIG. 3) when power is switched off.

INDUSTRIAL APPLICABILITY

The method of checking the operation of the diagnostic circuit in the load drive circuit according to the present invention can be widely applied not only to electronic control devices such as controllers of vehicles, motorcycles, agricultural vehicles, machine tools, or vessels, but also to general electronic control devices for driving loads, after the drive circuit has been mounted in such an electronic control device.

What is claimed is:

1. A load drive circuit built into an electronic control device, which includes a control circuit that controls the load drive circuit with a load drive signal and which drives a load including at least one of a solenoid, relay, switch, heater, and a motor using a DC power supply as a power supply, the load drive circuit comprising:
  a switching element which turns ON and OFF in response to the load drive signal; and
  a diagnostic circuit which detects an abnormal state of the switching element,
  wherein a drive-stop signal output from the control circuit to the load drive circuit maintains an OFF state of the switching element without being affected by changes in the load drive signal from the control circuit,
  wherein, upon input of the drive-stop signal to the load drive circuit, the diagnostic circuit carries out a diagnosis on the load drive circuit in response to the load drive signal for detecting the abnormal state of the switching element to confirm a normal operational state of the diagnostic circuit, while being mounted in the electronic control device,
  wherein whether the diagnostic circuit is normally operating or not is checked during a system stop process that is executed during the period from the input of a power-off signal to the electronic control device until the power of the electronic control device is switched off, and
  wherein the load drive circuit is built into a vehicle's load drive device, and whether the diagnostic circuit is normally operating or not is checked during the system stop process, the system stop process being executed after an ignition key of a vehicle has been turned to an "off" position.

2. The load drive circuit according to claim 1, wherein the load drive signal is input to the load drive circuit, in which the operation of the switching element has stopped in response to the drive-stop signal from the control circuit, to detect the abnormal state of the switching element, so that whether the diagnostic circuit is normally operating or not is checked.

3. The load drive circuit according to claim 1, wherein:
  the load drive circuit is a low-side driver,
  the load drive circuit, in response to a drive-stop signal, enters a disable state in which the operation of the switching element stops, and
  the load drive circuit, in response to an input signal for driving, causes the diagnostic circuit to monitor the voltage at a terminal of the load or the current flowing through the load drive circuit, so that the operation of the diagnostic circuit is checked.

4. The load drive circuit according to claim 1, wherein:
  the load drive circuit is a high-side driver,
  the load drive circuit, in response to a drive-stop signal, enters a disable state in which the operation of the switching element stops, and
  the load drive circuit, in response to an input signal for driving, causes the diagnostic circuit to monitor the voltage at a terminal of the load or the current flowing through the load drive circuit, so that the operation of the diagnostic circuit is checked.

5. The load drive circuit according to claim 1, wherein:
  the load drive circuit is a motor drive circuit that drives a motor such as a brushed DC motor, three-phase motor, or stepping motor,
  the load drive circuit, in response to a drive-stop signal, enters a disable state in which the operation of the switching element stops, and
  the load drive circuit, in response to an input signal for driving, causes the diagnostic circuit to monitor the voltage at a terminal of the load or the current flowing through the load drive circuit, so that the operation of the diagnostic circuit is checked.

6. The load drive circuit according to claim 1, wherein the switching element is a bipolar transistor.

7. The load drive circuit according to claim 1, wherein the switching element is an FET.

8. The load drive circuit according to claim 1, wherein the switching element is 12 IGBT.

9. The load drive circuit according to claim 1, wherein operation of the diagnostic circuit is checked in an inactive state of the switching element and in an active state of the switching element.

10. The load drive circuit according to claim 1, wherein, when a diagnostic checking signal is input, the diagnostic circuit judges the presence or absence of an abnormality in a disable state first, and then the diagnostic circuit judges the presence or absence of an abnormality in an enable state, and diagnosis results from the diagnostic circuit are transmitted to the control circuit, and then the system stop process is terminated and a normal operation mode is entered, such that operation of the diagnostic circuit when power is switched on is checked.

11. The load drive circuit according to claim 10, wherein the diagnostic circuit has no influence on operation of the load.

12. The load drive circuit according to claim 10, wherein if operation of the load in the normal operation mode stops for a longer time than a time required for a diagnosis, another diagnosis is performed.

13. A load drive circuit built into an electronic control device, which includes a control circuit that controls the load drive circuit with a load drive signal and which drives a load including at least one of a solenoid, relay, switch, heater, and a motor using a DC power supply as a power supply, the load drive circuit comprising:
  a switching element which turns ON and OFF in response to the load drive signal; and
  a diagnostic circuit which detects an abnormal state of the switching element,
  wherein a drive-stop signal output from the control circuit to the load drive circuit maintains an OFF state of the switching element without being affected by changes in the load drive signal from the control circuit, wherein, upon input of the drive-stop signal to the load drive circuit, the diagnostic circuit carries out a diagnosis on the load drive circuit in response to the load drive signal for detecting the abnormal state of the switching element to confirm a normal operational state of the diagnostic circuit, while being mounted in the electronic control device, wherein whether the diagnostic circuit is normally operating or not is checked during a system initialization process that is executed after the control circuit is switched on, and wherein the control circuit controls the electronic control device including the load drive circuit, and wherein the load drive circuit is built into a vehicle's load drive device, and whether the diagnostic circuit is normally operating or not is checked during the system initialization process, the system initialization process being executed after an ignition key of a vehicle has been turned to an "on" position.

14. The load drive circuit according to claim 13, wherein the load drive signal is input to the load drive circuit, in which the operation of the switching element has stopped in response to the drive-stop signal from the control circuit, to detect the abnormal state of the switching element, so that whether the diagnostic circuit is normally operating or not is checked.

15. The load drive circuit according to claim 13, wherein:
the load drive circuit is a low-side driver,
the load drive circuit, in response to a drive-stop signal, enters a disable state in which the operation of the switching element stops, and
the load drive circuit, in response to an input signal for driving, causes the diagnostic circuit to monitor the voltage at a terminal of the load or the current flowing through the load drive circuit, so that the operation of the diagnostic circuit is checked.

16. The load drive circuit according to claim 13, wherein:
the load drive circuit is a high-side driver,
the load drive circuit, in response to a drive-stop signal, enters a disable state in which the operation of the switching element stops, and
the load drive circuit, in response to an input signal for driving, causes the diagnostic circuit to monitor the voltage at a terminal of the load or the current flowing through the load drive circuit, so that the operation of the diagnostic circuit is checked.

17. The load drive circuit according to claim 13, wherein:
the load drive circuit is a motor drive circuit that drives a motor such as a brushed DC motor, three-phase motor, or stepping motor,
the load drive circuit, in response to a drive-stop signal, enters a disable state in which the operation of the switching element stops, and
the load drive circuit, in response to an input signal for driving, causes the diagnostic circuit to monitor the voltage at a terminal of the load or the current flowing through the load drive circuit, so that the operation of the diagnostic circuit is checked.

18. The load drive circuit according to claim 13, wherein the switching element is a bipolar transistor.

19. The load drive circuit according to claim 13, wherein the switching element is an FET.

20. The load drive circuit according to claim 13, wherein the switching element is an IGBT.

21. The load drive circuit according to claim 13, wherein operation of the diagnostic circuit is checked in an inactive state of the switching element and in an active state of the switching element.

22. The load drive circuit according to claim 13, wherein, when a diagnostic checking signal is input, the diagnostic circuit judges the presence or absence of an abnormality in a disable state first, and then the diagnostic circuit judges the presence or absence of an abnormality in an enable state, and diagnosis results from the diagnostic circuit are transmitted to the control circuit, and then the system initialization process is terminated and a normal operation mode is entered, such that operation of the diagnostic circuit when power is switched on is checked.

23. The load drive circuit according to claim 22, wherein the diagnostic circuit has no influence on operation of the load.

24. The load drive circuit according to claim 22, wherein if operation of the load in the normal operation mode stops for a longer time than a time required for a diagnosis, another diagnosis is performed.

* * * * *